United States Patent [19]

Tsuru

[11] Patent Number: 5,426,482
[45] Date of Patent: Jun. 20, 1995

[54] DISTANCE-MEASURING APPARATUS

[75] Inventor: Hiroyuki Tsuru, Tokyo, Japan

[73] Assignee: Nikon Corporation, Tokyo, Japan

[21] Appl. No.: 180,322

[22] Filed: Jan. 12, 1994

[30] Foreign Application Priority Data

Jan. 14, 1993 [JP] Japan .................. 5-005374

[51] Int. Cl.$^6$ ............................................. G03B 13/36
[52] U.S. Cl. .................................. 354/403; 250/201.4
[58] Field of Search .......................... 354/403, 195.12; 250/201.4, 201.5, 201.6

[56] References Cited

U.S. PATENT DOCUMENTS

| 5,051,767 | 9/1991 | Honma et al. | 354/403 X |
| 5,128,529 | 7/1992 | Nagaoka et al. | 354/403 X |
| 5,137,350 | 8/1992 | Misawa et al. | 354/403 X |
| 5,148,011 | 9/1992 | Taka | 354/403 X |
| 5,235,376 | 8/1993 | Inoue et al. | 354/403 |
| 5,264,892 | 11/1993 | Nonaka et al. | 354/403 |

FOREIGN PATENT DOCUMENTS 2-222806   9/1990   Japan .
2-293615  12/1990   Japan .
4-317017  11/1992   Japan .

Primary Examiner—Russell E. Adams
Attorney, Agent, or Firm—Shapiro and Shapiro

[57] ABSTRACT

A distance-measuring apparatus comprises a light emitting device for emitting a beam toward a plurality of portions in a field, a light receiving device for receiving a reflection beam from an object located at each of the plurality of portions and outputting a receiving signal according thereto, a selecting device for searching out a region where the receiving signal exceeds a predetermined value out of the plurality of portions and selecting an aimed portion for distance measurement from the searched-out region where the receiving signal exceeds the predetermined value, and a measuring device for measuring an object distance based on a receiving signal from the aimed portion for distance measurement.

7 Claims, 8 Drawing Sheets

DISTANCE-MEASURING APPARATUS

BACKGROUND OF THE INVENTION

1. Field of the Invention

The present invention relates to a distance-measuring apparatus of a so-called active type, which measures a distance to an object by emitting a light beam toward the object and receiving a reflection beam from the object.

2. Related Background Art

An example of conventionally known distance-measuring apparatus of this type is what is disclosed in Japanese Laid-open Patent Application No. 2-222806. The apparatus has a light emitting element for selectively emitting a light beam toward a plurality of regions in a field and a light receiving element for receiving a reflected beam from an object irradiated by the emitted beam. The apparatus detects a region in which an output (receiving signal) from the light receiving element greatly changes and measures an object distance, based on a direction of the emitted beam to the detected region. Thus, the apparatus can measure a distance to a closest object among those in the plurality of regions thus irradiated, whereby for example in case two persons stand side by side in the field to be shot, the so-called mid-focused shooting, in which the apparatus is in focus with a portion between the two persons (i.e., with the background), can be prevented.

Also, Japanese Laid-open Patent Application No. 2-293615 discloses another distance-measuring apparatus, in which a light emitting element emits a beam divided into sections in the horizontal direction for example and is moved in the vertical direction, whereby the distance can be measured in a plurality of regions in the field in the vertical and horizontal directions. The apparatus selects a closest object distance from the measurement results to prevent the mid-focused shooting thereby as well.

Meanwhile, if in such distance-measuring apparatus of the active type a beam emitted from the light emitting element impinges on a border between a main object and the background, only a part of the emitted beam is reflected by the main object and then received by the light receiving element. In this case, the barycenter of the received beam is offset on the light receiving element from that of a beam supposed to be totally reflected, which could cause out-of-focus or unsharpness because of the inaccurate measurement result. Nevertheless, the apparatus as disclosed in the above applications prepared no means for such an error in distance measurement caused by the lack of received beam.

SUMMARY OF THE INVENTION

It is an object of the present invention to provide a distance-measuring apparatus which can prevent a lack of a beam reflected by an object and thereby can always obtain accurate result of distance measurement.

Explaining with FIG. 1, the present invention can be applied to a distance-measuring apparatus provided with light-emitting means 101 for emitting a beam to irradiate a plurality of portions in a field and light-receiving means 102 for receiving a reflection beam from an object located at each of said plurality of portions and outputting receiving signals according to the thus received reflection beams, which measures an object distance based on the receiving signals from the light-receiving means 102.

Further, the apparatus has selecting means 103 for searching out portions with a receiving signal exceeding a predetermined value out of said plurality of portions and selecting any one of the thus searched-out portions as an aimed portion for distance measurement, and measuring means 104 for measuring an object distance based on a receiving signal from the thus selected, aimed portion for distance measurement, whereby the above-described problem can be solved.

In another embodiment, the predetermined value of receiving signal is a value obtained by subtracting a pre-set value from a maximum value of the receiving signals from the plurality of portions.

In another embodiment, in case there are a plurality of portions with a receiving signal exceeding the predetermined value, adjacent to each other, a portion located at the center among them is selected as the aimed portion for distance measurement.

In another embodiment, the selecting means comprises a storage portion for storing the mutually adjacent portions with a receiving signal exceeding the predetermined value, and a selecting portion which, when a number of portions stored in the storage portion reaches a predetermined value, selects a portion located at the center among the stored portions as an aimed portion for distance measurement.

In another embodiment, the apparatus further has drive means for rotating the light emitting means so as to emit a beam toward the plurality of portions in the field, and is arranged to narrow a range of rotation of the light emitting means as an angle of shooting field decreases.

The light emitting means 101 emits a beam toward a plurality of portions in the field and the light receiving means 102 receives a reflection beam from an object located at each portion. The light receiving means 102 outputs receiving signals according to the reflection beams. The selecting means 103 searches out portions with a receiving signal exceeding the predetermined value out of the plurality of portions and selects one of the thus searched-out portions as an aimed portion for distance measurement. The measuring means 104 measures an object distance based on a receiving signal from the thus selected, aimed portion for distance measurement. Here, it can be considered that a fact that a receiving signal exceeds the predetermined value means that an emitted beam is substantially totally received by the light receiving means 102 without missing in reflection. Therefore, no error will be caused in distance measurement when the object distance is determined based on the receiving signal.

DESCRIPTION OF THE PREFERRED EMBODIMENTS

An embodiment of the present invention will be described referring to FIG. 2 to FIG. 9.

Figure 1:
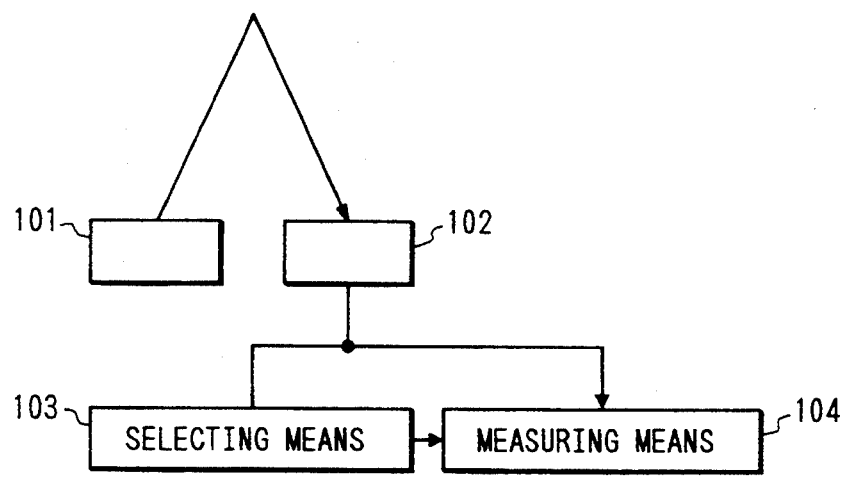
FIG. 1 is a schematic drawing to show a distance-measuring apparatus according to the present invention.
Figure 2:
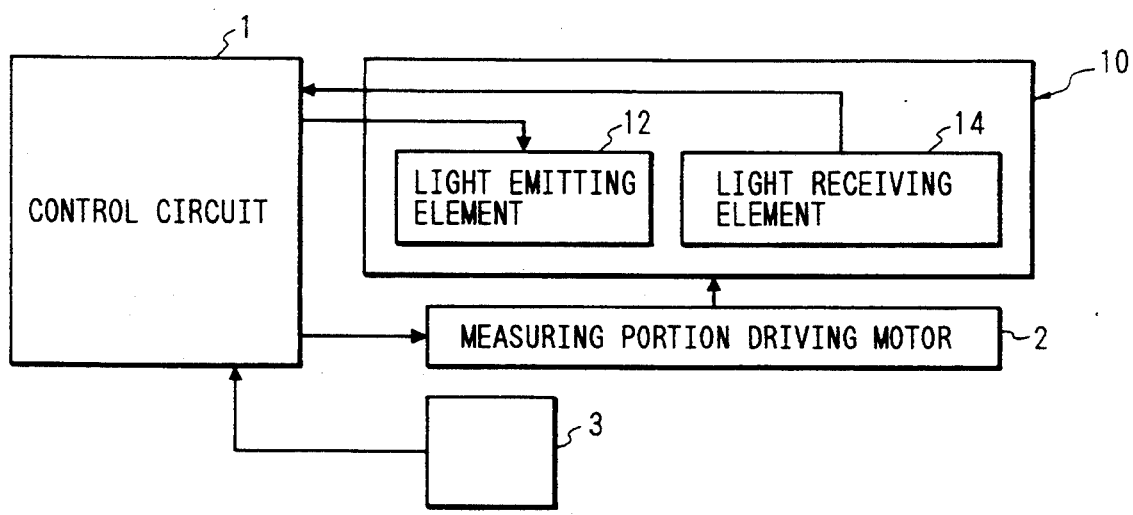
FIG. 2 is a drawing to show the overall construction of a distance-measuring apparatus in an embodiment.
Figure 3:
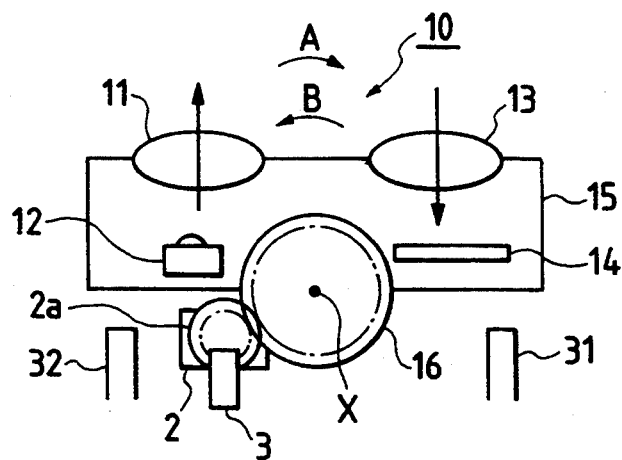
FIG. 3 is a drawing to show the detailed structure of a distance-measuring portion.

FIG. 2 is a block diagram to show the structure of a distance-measuring apparatus according to the present invention, in which a control circuit 1 is built in a camera body and in which a distance-measuring portion 10, a measuring-portion driving motor 2 and a photo interrupter 3 are connected to the control circuit 1. As shown in FIG. 3, the measuring portion 10 has a light emitting element 12 for emitting an infrared beam toward an object through a projection lens 11 and a light receiving element 14 for receiving an infrared beam reflected from an object through a receiving lens 13.

Numeral 15 designates a base, on which the light emitting element 12, the light receiving element 14 and the projection and receiving lenses 11, 13 are fixed. Also, a gear 16 is set at a distal end of a shaft arranged to project on the base 15. Another gear 2a is set on an output shaft of the measuring-portion driving motor 2 to mesh with the gear 16. Then, when the motor 2 rotates, the base 15, that is, the metering portion 10 rotates about the axis X in the horizontal plane through the gears 2a, 16. Numerals 31, 32 denote stops for respectively regulating the rotation of base 15 in the direction A and in the direction B.

The photo interrupter 3 detects holes for example perforated at equal angular intervals in the gear 2a to output a pulse signal. Thus, pulses according to an amount of rotation of the measuring portion 10 are output from the photo interrupter 3.

In the present embodiment, distance measurement is carried out such that, in a state of the light emitting element 12 emitting an infrared beam, the measuring portion 10 is rotated in the direction A from the position where it is in contact with the stop 32 to the position where it is in contact with the stop 31. By this motion, the infrared beam emitted from the light emitting element 12 continuously irradiates a range of from point P to point Q on the picture plane shown in FIG. 4 while moving in the horizontal direction. The thus irradiating infrared beam is reflected by an object present at each position. The reflected beam is received by the light receiving element 14, which outputs a receiving signal according to an amount of received light.

Figure 5:
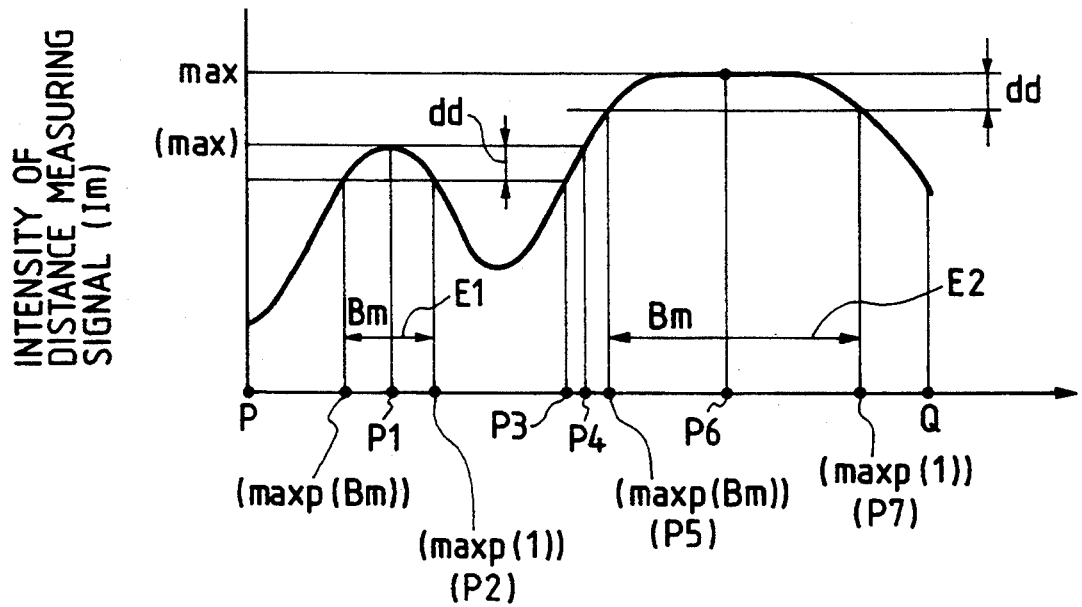
FIG. 5 is a drawing to indicate a magnitude of receiving signal at each irradiation position.

FIG. 5 shows a magnitude of each receiving signal in the range of from point P to point Q, in which E2 indicates a region in which the receiving signal exceeds a value of (max-dd) in the range of from point P to point Q. Here, max represents a maximum value of all receiving signals and dd a fixed value preliminarily determined. In the present embodiment, the above operation is performed to search out a region in which the receiving signal exceeds (max-dd) (the region E2 in FIG. 5) and to select the center of the region (point P6 in FIG. 5) as an aimed portion for distance measurement. Its detailed procedure will be described with the flowcharts in FIG. 6 to FIG. 9.

Figure 6:
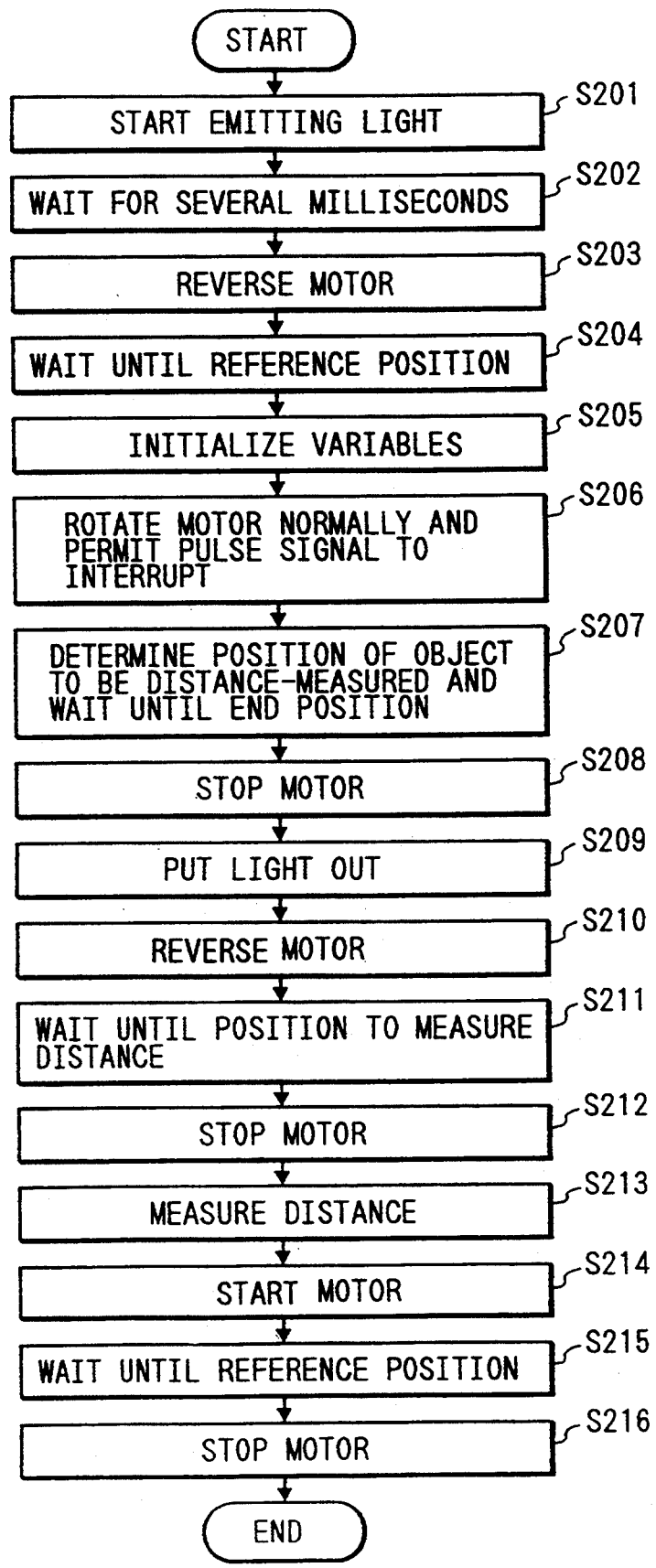
FIG. 6 is a main flowchart to illustrate the operation of the embodiment.

FIG. 6 is the main flowchart, the program in which is started for example when a shutter release button (not shown) is half-pressed. First at Step S201, the light emitting element 12 is activated to emit an infrared beam, and next at Step S202, the apparatus stands by for several milliseconds before the output from the light emitting element 12 becomes stabilized. At Step S203 the motor 2 is reversed to rotate the base 15 through the gears 2a, 16, i.e., to rotate the measuring portion 10 in the direction B in FIG. 3.

At Step S204 the apparatus stands by before the measuring portion 10 reaches the reference position. Here, the reference position is the position where the measuring portion 10 comes into contact with the stop 32, which is the position at which the emitted beam impinges on point P in FIG. 4. When the measuring portion 10 reaches the reference position, the measuring portion 10 comes into contact with the stop 32 to stop the rotation of motor 2 and then to stop the photo interrupter 3 outputting pulses, whereby the moment when it reaches the reference position can be detected.

The present embodiment is so arranged that the measuring portion 10 is driven to return to the reference position after the distance measurement is finished, as described hereinafter. Therefore, the processes at Steps S203 and S204 are essentially unnecessary. These processes are carried out for an incidence in which the measuring portion 10 is located away from the reference position by chance.

Figure 7:
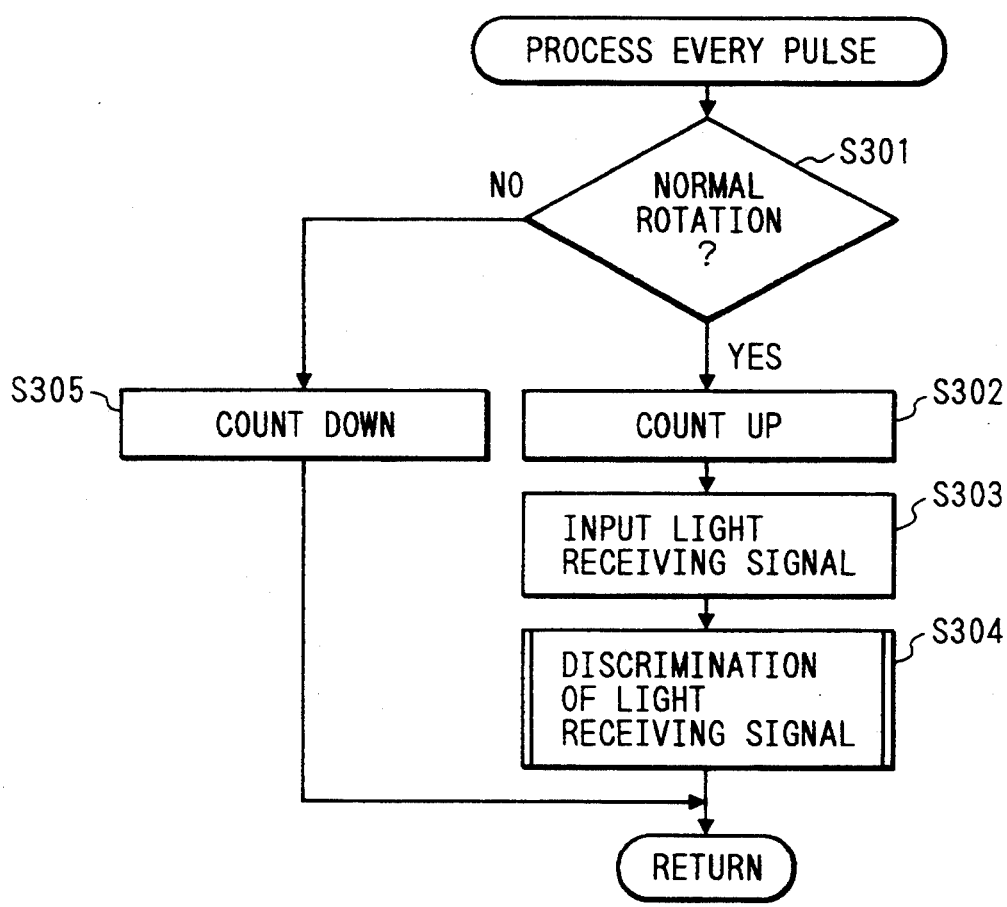
FIG. 7 is a flowchart to show the procedure for determining a position for distance measurement.
Figure 8:
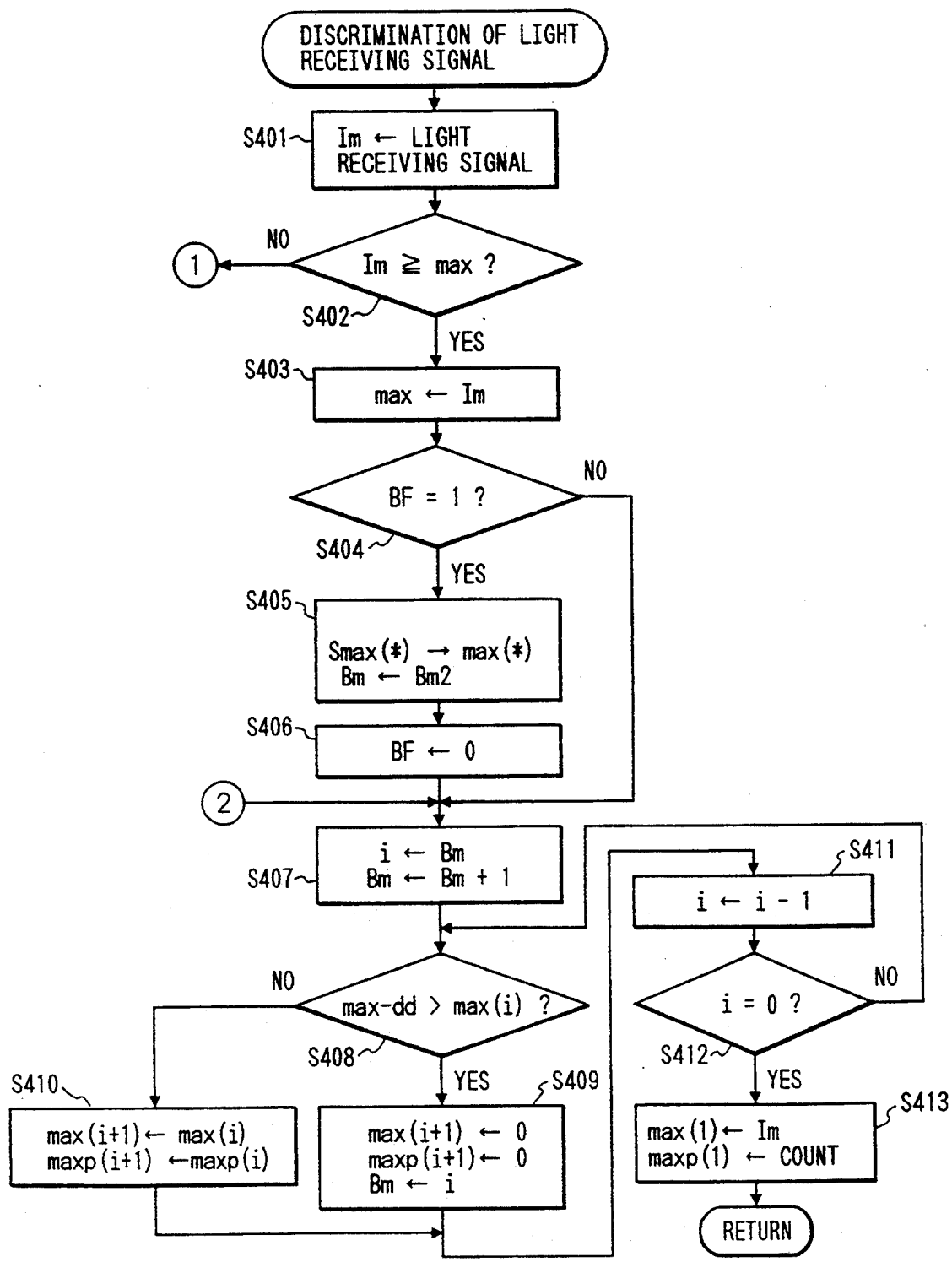
FIG. 8 is a flowchart to show the details of a receiving-signal judging process in FIG. 7.
Figure 9:
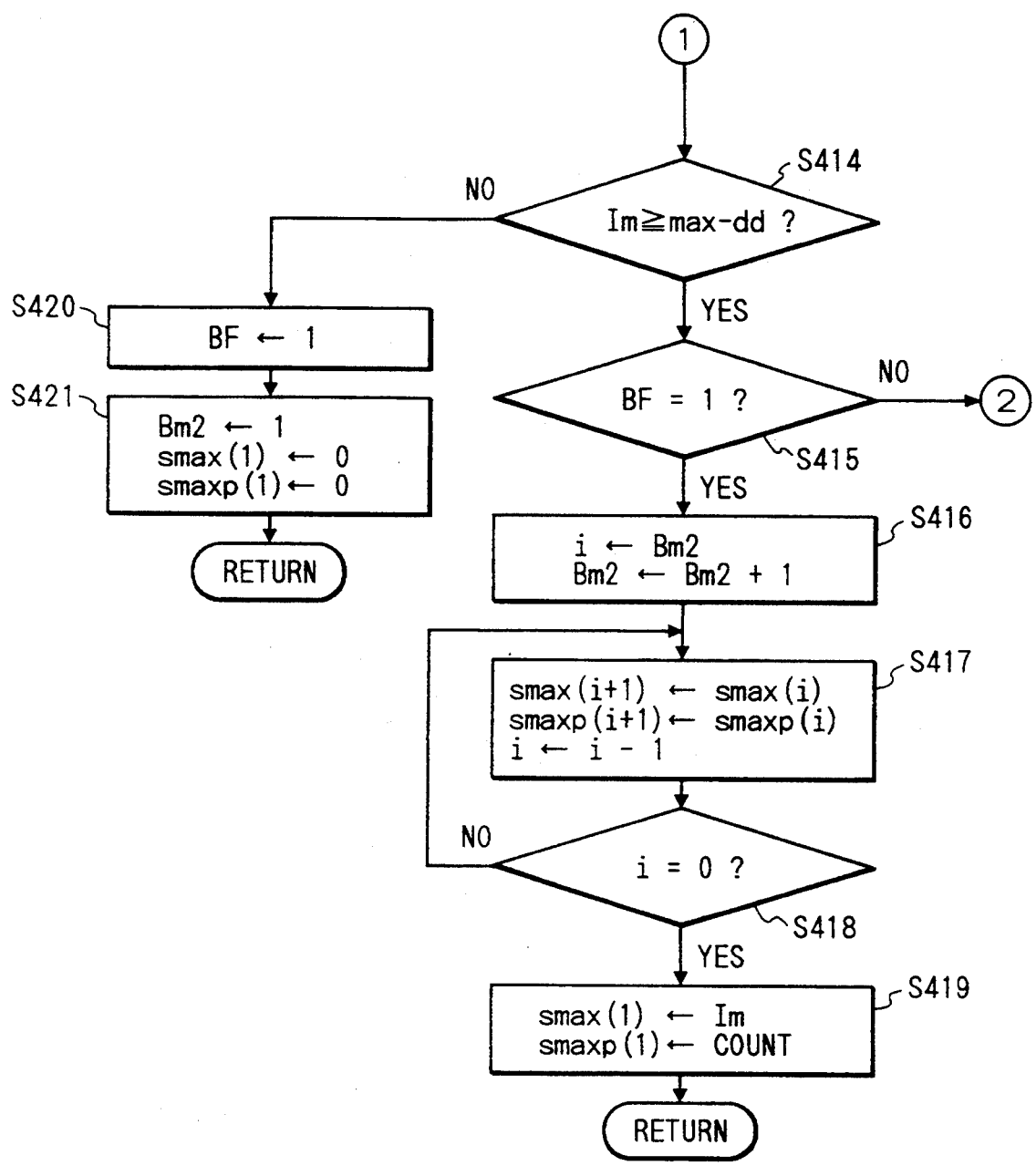
FIG. 9 is a flowchart to follow FIG. 8.

When the measuring portion 10 reaches the reference position, variables used in the processing in FIG. 7 to FIG. 9 as described hereinlater are initialized at Step S205. In more detail, variables count, max, max (1), maxp (1), smax (1), smaxp (1), BF each are reset to "0" and variables Bm, Bm2 to "1".

These variables are below described one by one. The variable "count" represents a count number of pulses output from the photo interrupter 3, which indicates each position between point P and point Q. The variable "max" represents a maximum value of receiving signals, as described above. Since the processing proceeds in order from point P to point Q in the present embodiment, the variable max is a receiving signal at point P1 before point P4 in FIG. 5 for example.

Also, the variable maxp (1) stores a position closest to point Q in the region where the receiving signal exceeds (max-dd) (the region E2 in FIG. 5), and max (1) stores a magnitude of the receiving signal at the position. Further, maxp (Bm) stores a position closest to point P in the above region E2, and maxp (2), maxp (3), ... store corresponding positions between maxp (1) and maxp (Bm) in order. Bm represents the width of the above region.

The variable "BF" is a flag which is set to "1" when a region where a receiving signal exceeds (max-dd) is determined. In the example shown in FIG. 5, the flag BF is set at "1" between point P1 and point P4 and between point P7 and point Q, while at "0" for other positions. Also, smax (1) and smaxp (1) are variables for storing values similar to the above variables max (1) and maxp (1), preparing for a case in which the maximum value max is renewed after a region where a receiving signal exceeds (max-dd) (E1 in FIG. 5) is once determined.

Next at Step S206, the motor 2 is stopped and then normally rotated, and interruption of pulse signal from the photo interrupter 3 is permitted. The normal rotation of motor 2 rotates the measuring portion 10 in the direction A in FIG. 3 so as to move the beam emitted from the light emitting element 12 from point P to point Q. After the pulse interruption permission, the processing in FIG. 7 (as detailed below) is interruption-started every time a pulse signal is input. Repeating the processing in FIG. 7, the region where a receiving signal exceeds (max-dd) is determined. Subsequently, at step S207 the apparatus waits for the judgement that the measuring portion 10 reaches the end position (the position where the measuring portion 10 comes into contact with the stop 31, which is the position where the emitted beam is guided to point Q in FIG. 4), and then at Step S208 the motor 2 is stopped.

Next at Step S209 the light emitting element 12 is de-activated, and at Step S210 an aimed portion for distance measurement (point P6 in FIG. 5) is determined from the region obtained in the above processing in FIG. 7 and the motor 2 is reversed to rotate the measuring portion 10 in direction B up to a position for distance measurement (which is a position where the emitted infrared beam is guided to the above-determined aimed portion for distance measurement). At Step S211 the apparatus stands by before the measuring portion 10 reaches the position for distance measurement. When it reaches the position, the motor 2 is stopped at Step S212. How to determine the aimed portion for distance measurement will be described later, but it is determined by a pulse count number from point P. Accordingly, the measuring portion 10 is moved from point Q in the direction B by the reverse rotation of the motor, while counting down the variable count every time a pulse is output from the photo interrupter 3. When the value of count reaches a count number at the aimed portion for distance measurement obtained above, the motor 2 is stopped, whereby the measuring portion 10 can be stopped at the above position for distance measurement.

At Step S213, the light emitting element 12 is activated to emit an infrared beam, with which the distance measurement is carried out. In more detail, the infrared beam from the light emitting device 12 is reflected by an object and thereafter received by the light receiving element 14. As well known, the light receiving element 14 outputs receiving signals I1, I2 from the opposite ends thereof for example. From these receiving signals I1, I2, a receiving position of the reflected infrared beam is obtained on the light receiving element, and an object distance is obtained based thereon. Next at Step S214 the motor is again rotated in reverse to rotate the measuring portion 10 in the direction B, and at Step S215 the apparatus stands by before the measuring portion 10 reaches the reference position. When the measuring portion reaches the reference position, the motor is stopped at Step S216, and the processing is finished.

Then, focusing of a photo-taking lens is carried out based on the thus obtained object distance, but the details thereof are omitted herein, because the focusing process is well known and has no direct connection with the present invention.

FIG. 7 shows the details of the interruption executed every time a pulse is input from the photo interrupter 3 between Steps S206 and S207.

With a pulse input, the processing from Step S301 in FIG. 7 is started. First at Step S301 whether the motor 2 is in normal rotation or in reverse rotation is judged. If it is in reverse rotation, that is, if the measuring portion 10 is moving in the direction B, the pulse count number "count" is counted down at Step S305 and then the flow returns to the processing in FIG. 6. On the other hand, if the motor 2 is in forward rotation, that is, if the measuring portion 10 is moving in the direction A, the flow proceeds to Step S302 to count up the number "count," and then at Step S303 a receiving signal of the light receiving element 14 is taken in. Subsequently, a receiving-signal judging process is executed at Step S304 and then the flow returns to the processing in FIG. 6.

The details of the receiving-signal judgement processing will be given referring to FIG. 8 and FIG. 9.

First at Step S401 the thus read receiving signal from the light receiving element 14 (for example the signal I1+I2) is stored in the variable Im, and at Step S402 it is judged if Im is not less than the maximum max (which is preliminarily reset to zero). When Step S402 is affirmed, Im is stored in max at Step S403, and then at Step S404 the state of flag BF is checked. If flag BF is "0", the flow goes to Step S407 to store the variable Bm in i and then Bm is given an increment of "1". At Step S408 comparison is made between a value of subtraction of the predetermined value dd from a current maximum max of receiving signals (see FIG. 5) and max (i). In other words, it is judged if the previously read and stored receiving signal max (i) is smaller than (max-dd). If max-dd>max (i) then the flow goes to Step S409; if max-dd≦max (i) then the flow goes to Step S410.

At Step S409, max (i+1) and maxp (i+1) each are set to "0" and the value of i is stored in Bm. Then at Step S410, the value of max (i) is shifted to max (i+1) and the value of maxp (i) is also shifted to maxp (i+1). Subsequently, at Step S411, i is given an increment of "−1" and at Step S412 the value of i is checked. Unless i=0 then the flow returns to Step S408; if i=0 then to Step S413. At Step S413 the current receiving signal Im is stored in max (1) and the present pulse count number "count" is stored in maxp (1). Then the flow returns to the processing in FIG. 7.

Here, if the receiving signal is increasing from the beginning, for example from point P to point P1 in FIG. 5, Step S402 is always affirmed to renew the value of max. Therefore, the above-described processing from Steps S407 to S413 is continued. This processing is for obtaining maxp (1) to maxp (Bm) as described above.

In contrast, if the receiving signal is decreasing, for example from point P1 as shown, Step S402 is negated and then the flow proceeds to the processing below Step S414 in FIG. 9. At Step S414, comparison is made between the current receiving signal Im and (max-dd). If Im≧max-dd for example as in a region between point P1 and point P2, the flow goes to Step S415. At Step S415 the flag BF is checked. If the flag BF is "0" then the flow goes to Step S407 to execute the processing from Step S407.

In contrast, if Im<max-dd at Step S414 (for example between point P2 and point P3), the flow goes to Step S420 to set the flag BF to "1". Then at Step S421, the variable Bm2 is set to "1" and smax (1) and smaxp (1) both are set to "0". Then the flow returns to the processing in FIG. 7.

In the example in FIG. 5, the region E1 is first determined after the process at point P2 with maxp (1) to maxp (Bm) settled. If the maximum value max is renewed after that, maxp (1) to maxp (Bm) are also renewed.

If Step S414 is affirmed after the flag BF is set to "1" at Step S420 (for example as in the region between point P3 and point P4), Step S415 is affirmed and then the processing from Step S416 is executed. At Step S416 the value of variable Bm2 is set in i and is given an increment of "1", and then the flow goes to Step S417. At Step S417, the value of smax (i) is shifted by one to smax (i+1) and the value of smaxp (i) is also shifted to smaxp (i+1). Also, i is given an increment of "−1" and then the flow goes to Step S418. Unless i=0 at Step S418 then the flow returns to Step S417; if i=0 then to Step S419. At Step S419 the current receiving signal Im is stored in smax (1) and the present pulse count number "count" is stored in smaxp (1). Then the flow returns to the processing in FIG. 7.

Then, if the receiving signal Im exceeds the previous maximum (max) (as in the region after point P4 in FIG. 5), Step S402 is again affirmed and max is renewed at Step S403. Since BF=1 in that case, Step S404 is affirmed and the flow goes to Step S405. At Step S405 each value of smax (*) (where *=1, 2, . . . , Bm) is transferred into max (*), and each value of smaxp (*) into maxp (*). The value of Bm2 is also transferred into Bm. Then the flag BF is set to "0" at Step S406 and the processing from Step S407 is carried out similarly as described above.

The processing in FIG. 7 to FIG. 9 is repeated up to point Q, so that a region where a receiving signal exceeds (max-dd) is finally determined. In the example of FIG. 5, the position of point P7 is stored in maxp (1) and the position of point P5 in maxp (Bm).

After that, the position for distance measurement is determined at Step S210 in FIG. 6, as described above. The position for distance measurement is the center of the region where the receiving signal exceeds (max-dd) (which is point P6 in the example of FIG. 5). The center point can be obtained by the following calculation.

{max (1)−max (Bm)}/2+max (Bm)

Then the measuring portion 10 is rotated up to the position where the beam can be emitted to the thus obtained portion (the position for distance measurement), and a distance is measured at the position).

According to the above procedure, a beam is projected toward a plurality of portions in the field with rotation of the measuring portion 10 and the light receiving element 14 receives a reflection beam from an object located at each position to output a receiving signal. A region where the magnitude of each receiving signal exceeds (max-dd) is obtained, a center point of the region is selected as an aimed portion for distance measurement, and a distance is measured at the aimed portion for distance measurement. The fact that a receiving signal exceeds (max-dd) means that the emitted beam is received substantially in full amount by the light receiving element 14 without a lack in reflection. Thus, an error in distance measurement caused by a lack of refection beam can be prevented by obtaining an object distance based on the receiving signal.

Also, it can be considered that the region where the receiving signal exceeds (max-dd) includes a plurality of portions next to each other where a receiving signal exceeds (max-dd). This implies that the region represents an object. Accordingly, if the center point of the region is set as an aimed region for distance measurement as described above, the distance can be measured to an almost central portion of the object. Therefore, the possibility of lack of reflection beam is very low, enhancing the effect to prevent the error in distance measurement. Further, assuming that for example two persons stand side by side in the field, the reflected beam is stronger at the portions corresponding to the positions of persons than at the background as long as there is no high-reflectance object in front of the persons or in the background. Then, the above control determines with high probability that either of the portions where the persons stand is the aimed portion for distance measurement, achieving the prevention of mid-focused shooting.

In the above construction of the embodiment, the light emitting element 12 constitutes the light emitting means 101, the light receiving element 14 constitutes the light receiving means 102, and the control circuit 1 constitutes the selecting means 103 and the measuring means 104.

Figure 10A:
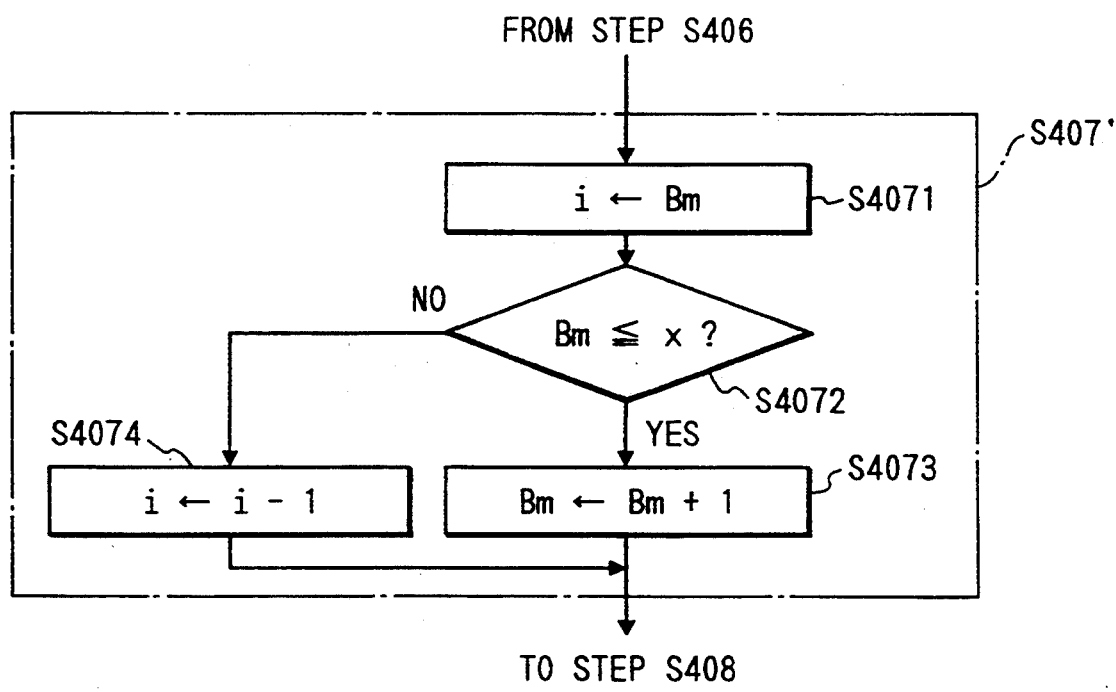
FIG. 10A and FIG. 10B are flowcharts respectively to show a part of another embodiment of the receiving-signal judging process.
Figure 10B:
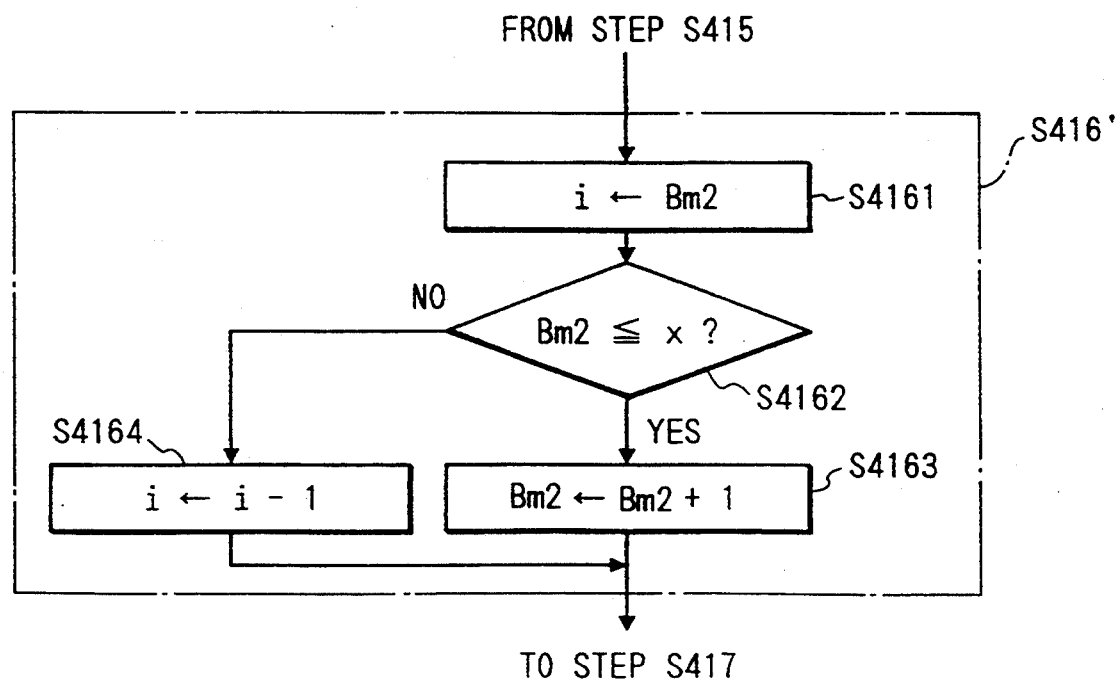

FIG. 10A and FIG. 10B show another embodiment.

FIG. 10A shows a change that Step S407' replaces Step S407 in FIG. 8. The other parts are the same as those in FIG. 8 and therefore are omitted. Step S407' is described as follows. First at Step S4071 the value of variable Bm is stored in i and then at Step S4072 Bm is compared with a predetermined value x. If Bm≦x then Bm is given an increment of "1" at Step S4073 and the flow goes to Step S408; if Bm>x then i is given an increment of "−1" at Step S4074 and the flow goes to Step S408.

FIG. 10B shows a change that Step S416' replaces Step S416 in FIG. 9. Steps S4161 to S4164 are the same as Steps S4071 to S4074 as described above except that Bm is changed into Bm2.

According to this flow, while mutually adjacent portions where a receiving signal from the light receiving element 14 exceeds (max-dd) are stored (memorized) in variable maxp (*), the increase in Bm is stopped when the number of portions Bm reaches x.

Accordingly, out of portions where a receiving signal exceeds (max-dd), x portions from one edge thereof are finally stored and the center point of the region is set as an aimed portion for distance measurement. Here, if the value of x is set to a value slightly larger than the width of a receiving beam for example, a beam emitted toward the thus determined aimed region for distance measurement impinges on a portion slightly shifted from the border between an object and the background toward the center of the object. Therefore, there is no lack of the reflection beam from the object, preventing an error in distance measurement similarly as described above. Since the present embodiment requires storage of only a part of portions even with a large region where the receiving signal exceeds (max-dd) (with large Bm), a memory in this embodiment may have a smaller storage capacity than those in the previous embodiments, which lowers the production cost.

Figure 11:
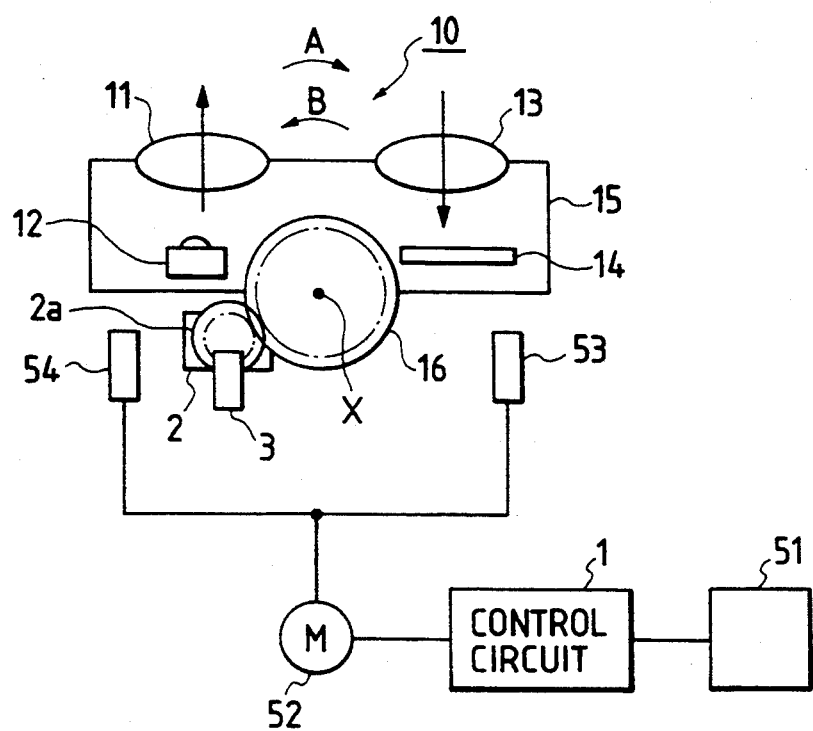
FIG. 11 is a drawing to show another embodiment which can change a rotation range of distance-measuring portion.

Meanwhile, some cameras for example with a zoom lens change a field angle depending upon the focal length of zoom lens. Accordingly, the range of rotation of the measuring portion 10 must be changed depending upon the focal length during the above control. In more detail, the rotation range of the measuring portion 10 must be narrowed as the focal length increases (as the shooting field angle becomes smaller). For such a case, the arrangement for example as shown in FIG. 11 may be employed. In the arrangement, a detector 51 is provided for detecting a focal length of a taking lens, two stops 53, 54 are arranged movable by motor 52 in a direction such that the stops 53, 54 move closer to the measuring portion 10 as the detected focal length increases.

Figure 4:
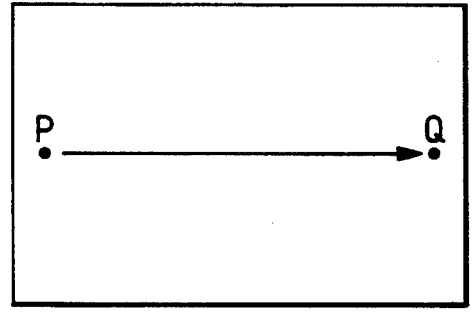
FIG. 4 is a drawing to show a range which a light beam from a light emitting element scans to irradiate.

Although the above embodiments show examples in which a portion where a measuring signal is (max-dd) is determined as an aimed region for distance measurement, a portion where a measuring signal is max may be determined as an aimed region for distance measurement. Further, the above embodiments are so arranged that the measuring portion 10 is rotated in the horizontal plane to emit an infrared light beam that moves in the horizontal direction of the image plane as shown in FIG. 4, but the measuring portion 10 may be rotated in the vertical plane to emit an infrared beam that moves in the vertical direction of the image plane. Yet further, the measuring portion 10 may be arranged to be rotatable both in the horizontal plane and in the vertical plane, so that the rotational direction thereof can be changed depending upon the posture of camera. To realize this, the posture of camera is detected for example by a conventional mercury switch, whereby the measuring portion 10 is rotated in the horizontal plane as in the above embodiments if the posture is horizontal while the measuring portion 10 is rotated in the vertical plane if the posture is vertical.

Although the entire measuring portion is rotated in the above embodiments, it can be arranged such that only the light emitting portion (light emitting element 30 and projection lens) is rotated.

According to the present invention, an apparatus is so arranged that light emitting means emits an irradiating beam to irradiate a plurality of regions in the field, that portions where a receiving signal exceeds a predetermined value are sought out from a plurality of portions, and that an aimed portion for distance measurement is selected from the thus sought portions. This arrangement enables distance measurement based on a reflection beam without a lack of reflection. Accordingly, the apparatus can prevent an error in distance measurement caused by a shift of a barycenter of receiving beam, which enables accurate focusing on an object and prevention of so-called mid-focused shooting.

In an embodiment, the predetermined value of receiving signal is a value obtained by subtracting a pre-set value from a maximum value of receiving signals from the plurality of portions and a portion where a receiving signal exceeds the value is set as an aimed portion for distance measurement. This arrangement can enhance the possibility of distance measurement based on a reflection beam without a lack of reflection, improving the prevention of error in distance measurement.

Another embodiment is so arranged that in case there are a plurality of mutually adjacent portions where a receiving signal exceeds the predetermined value, the portion located at the center thereof is selected as an aimed portion for distance measurement. The thus selected, aimed portion for distance measurement has a high probability of being the central portion of an object, and it is highly probable that the distance is measured based on a reflection beam without a lack of reflection.

Still another embodiment is so arranged that mutually adjacent portions where a receiving signal exceeds the predetermined value are stored and when the number of stored portions reaches a certain value, a portion located at the center of the stored portions is selected as an aimed portion for distance measurement. This arrangement can enjoy the same effect as the above embodiments and can reduce the capacity of a memory for storing the above portions, lowering the production cost.

What is claimed is:

1. A distance-measuring apparatus comprising:
    a light emitter for emitting a beam of light toward a plurality of portions in a field;
    a light receiver for receiving a reflection beam of light from an object located at each of said plurality of portions and outputting a corresponding signal having an intensity dependent upon the amount of received light;
    a selector responsive to said signals for selecting a portion in said field corresponding to a signal having an intensity that exceeds a predetermined value; and
    a measuring device for measuring distance to an object in the selected portion.

2. A distance-measuring apparatus according to claim 1, wherein said predetermined value is a value obtained by subtracting a predetermined fixed value from a maximum value of the signals corresponding to said plurality of portions.

3. A distance-measuring apparatus according to claim 1, wherein if signals corresponding to a plurality of mutually adjacent portions have intensities that exceed said predetermined value, a portion located at the center of the mutually adjacent portions as selected by said selector.

4. A distance-measuring apparatus according to claim 1, wherein said selector comprises a storage portion for storing information designating mutually adjacent portions in said field corresponding to signals having intensities that exceed said predetermined value, and a selecting portion which, when the number of said mutually adjacent portions reaches a predetermined number, selects a portion located at the center of the predetermined number.

5. A distance-measuring apparatus according to claim 1, further comprising:
    a driver for rotatively driving said light emitter so that said beam is emitted toward said plurality of portions; and
    a controller for determining a range of rotational driving of said light emitter in accordance with a photographing field angle.

6. A distance-measuring apparatus according to claim 5, wherein said controller decreases said range of rotational driving as said photographing field angle becomes smaller.

7. A distance-measuring apparatus comprising:
    a light emitting element for emitting a beam of light toward a plurality of portions in a field;
    a light receiving element for receiving light reflected by an object located at each of said plurality of portions and outputting a corresponding signal having an intensity dependent upon the amount of received light;
    a selector for selecting a portion located at the center of portions corresponding to signals having intensities that exceed a predetermined value; and
    a calculator for calculating distance to an object located at the selected portion.

* * * * *